United States Patent [19]

Udagawa et al.

[11] Patent Number: 4,965,664
[45] Date of Patent: Oct. 23, 1990

[54] COLOR IMAGE SIGNAL PROCESSING METHOD AND APPARATUS FOR RECORDING A COLOR IMAGE FROM INPUT COLOR IMAGE SIGNALS BY CONVERTING AN INDIVIDUAL COLOR SIGNAL COMPONENT

[75] Inventors: Yoshiro Udagawa, Tokyo; Hideo Takiguchi, Yokohama, both of Japan

[73] Assignee: Canon Kabushiki Kaisha, Japan

[21] Appl. No.: 84,185

[22] Filed: Aug. 12, 1987

[30] Foreign Application Priority Data

Aug. 15, 1986 [JP] Japan .................. 61-190585
Aug. 18, 1986 [JP] Japan .................. 61-192587
Oct. 21, 1986 [JP] Japan .................. 61-248366

[51] Int. Cl.⁵ .............................. H04N 1/46
[52] U.S. Cl. ..................... 358/80; 358/75; 358/79
[58] Field of Search ............ 358/75, 75 IJ, 78, 79, 358/80, 13, 30

[56] References Cited

U.S. PATENT DOCUMENTS

| 2,807,660 | 9/1957 | Rose | 358/79 |
|---|---|---|---|
| 2,848,528 | 8/1958 | Woll | 358/79 |
| 2,939,908 | 6/1960 | Shapiro | 358/79 |
| 4,058,828 | 11/1977 | Ladd | 358/80 |
| 4,500,919 | 2/1985 | Schreiber | 358/80 |
| 4,623,973 | 11/1986 | Hoffrichter et al. | 358/80 |
| 4,661,843 | 4/1987 | Sekizawa et al. | 358/80 |
| 4,667,228 | 5/1987 | Kawamura et al. | 358/80 |
| 4,675,704 | 6/1987 | Yamamoto | 358/80 |
| 4,731,662 | 3/1988 | Udagawa et al. | 358/80 |
| 4,745,466 | 5/1988 | Yoshida et al. | 358/80 |
| 4,752,822 | 6/1988 | Kawamura | 358/80 |
| 4,758,885 | 7/1988 | Sasaki et al. | 358/80 |

FOREIGN PATENT DOCUMENTS 61-120574 6/1986 Japan .

Primary Examiner—James J. Groody
Assistant Examiner—Mark R. Powell
Attorney, Agent, or Firm—Fitzpatrick, Cella, Harper & Scinto

[57] ABSTRACT

A color image signal processing apparatus for recording a color image from input color image signals includes an input unit for inputting color image signals composed of a plurality of color component signals into the apparatus, a unit for obtaining a luminance signal, a hue signal and a chroma signal based on the plurality of inputted color component signals, a gradation converter for converting the gradation characteristic of the luminance signal, and a color correction unit for performing color correction based on the luminance signal converted by the gradation converter, the hue signal and the chroma signal, and obtaining a recording original color signal. The hue and chroma signals are obtained based on spectrum tristimulus values which are obtained through conversion of said color component signals. The present invention thus enables more accurate color reproduction since it uses individual gradation conversion of the luminance signal.

33 Claims, 5 Drawing Sheets

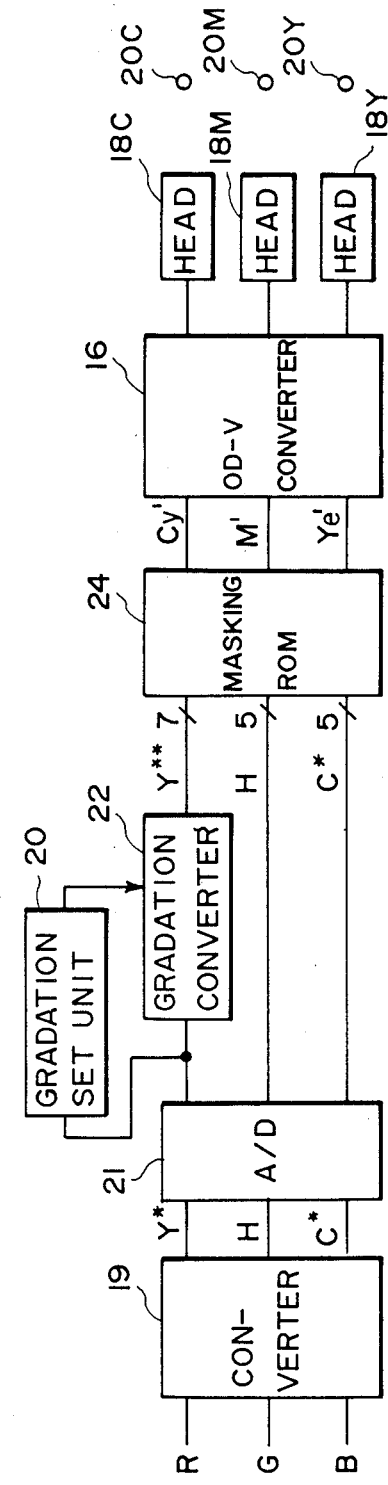
F I G. 4

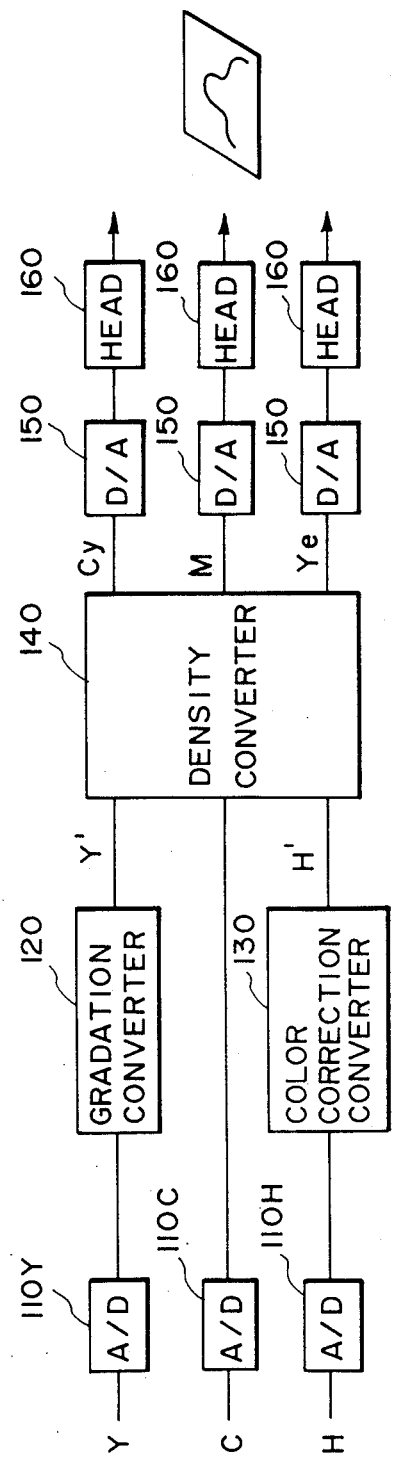
F I G. 6

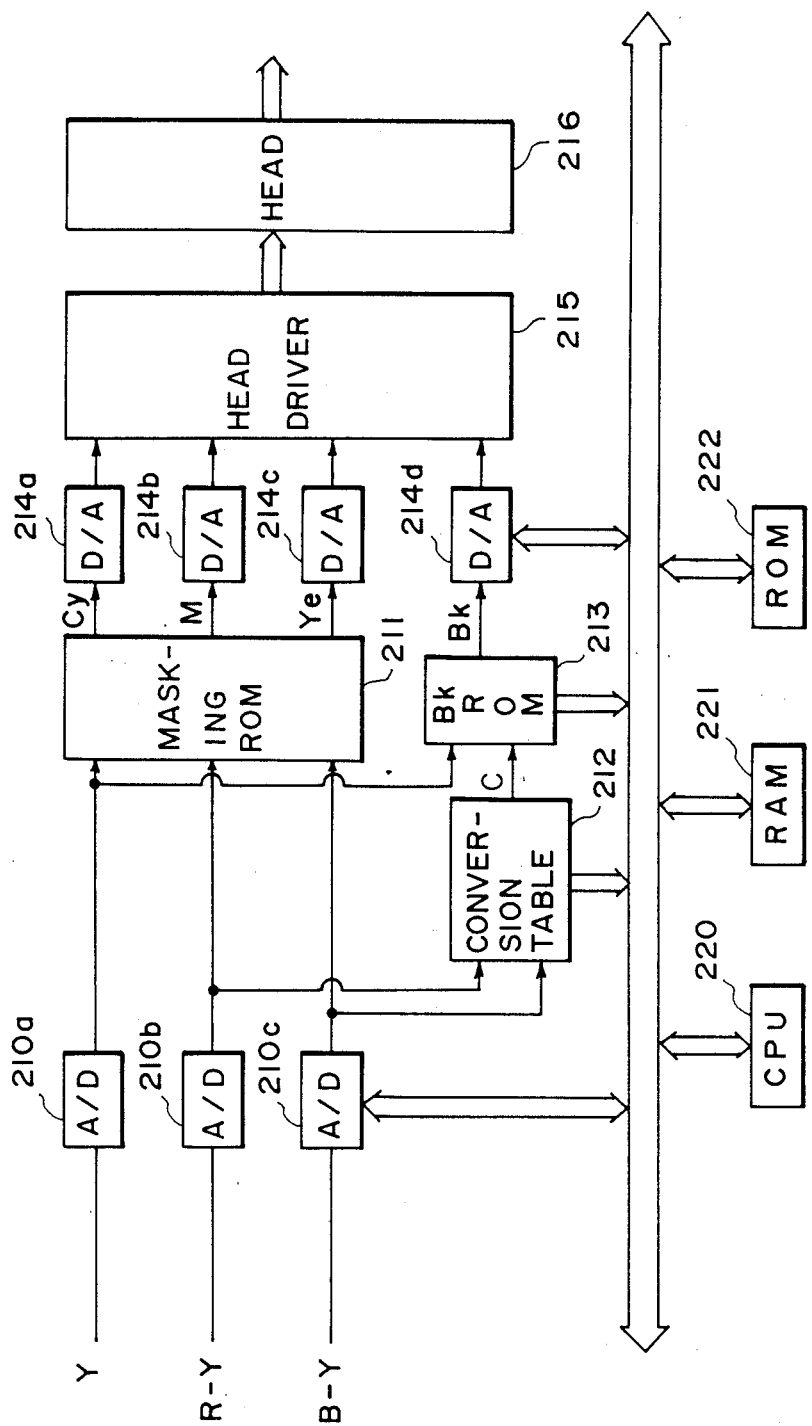
F I G. 8

COLOR IMAGE SIGNAL PROCESSING METHOD AND APPARATUS FOR RECORDING A COLOR IMAGE FROM INPUT COLOR IMAGE SIGNALS BY CONVERTING AN INDIVIDUAL COLOR SIGNAL COMPONENT

BACKGROUND OF THE INVENTION

1. Field of the Invention

The present invention relates to a color image signal processing method and apparatus for obtaining color signals for recording a color image from input color image signals.

2. Related Art

FIG. 1 is a block diagram showing the main part of a conventional ink-jet printer for recording a color image using video signals. R(red), G(green) and B(blue) analog input signals are converted into digital signals in A/D converter 11 and are then inputted to gamma converters 12R, 12G and 12B to be subjected to gradation conversion and complementary conversion, thereby obtaining gradation converted complementary color signals C, M and Y.

The complementary color signals C, M and Y are subjected to masking processing at a masking ROM 14 for the removal of ink colorless components (uneven color components) to obtain signals C', M' and Y'. The signals C', M' and Y' representative of ink optical densities (OD values) are converted into analog drive voltages by an OD-V converter 16 to obtain appropriate OD values. The analog drive voltages drive heads 18C, 18M and 18Y. The heads eject ink droplets 20C, 20M and 20Y to record a desired color image on a recording medium (not shown).

The masking ROM is constructed of a masking conversion table. However, it is difficult in practice to make the capacity of the table small since the color reproduction precision depends on the table capacity.

In the technology handling color image signals of subtractive mixture, a black signal produced from yellow (Ye), magenta (M) and cyan (Cy) signals of equal quantity does not follow the theory faithfully. Also, subtractive primaries are expensive. Because of the above and other reasons, it is common to form a color image using four color image data including an additional black signal (Bk).

FIG. 2 shows an example of a block for generating a black signal according to the prior art. The block including a black generation table 201 made of ROMs is applied to an ink-jet printer, which is shown in FIG. 3. The black generation table 201 shown in FIG. 2 is used to generate a black signal with a luminance signal (Y) and two color difference signals (R-Y) and (B-Y) inputted thereto. Upon input of signals Y, R-Y and B-Y, the table 201 outputs a signal Bk which has been previously calculated and stored therein. The calculation of Bk is as follows:

$$\begin{bmatrix} R = Y + (R - Y) \\ G = Y + \frac{1}{0.59}\{0.3(R - Y) + 0.11(B - Y)\} \\ B = Y + (B - Y) \end{bmatrix}$$

and $$\begin{bmatrix} Cy = -\log R \\ M = -\log G \\ Ye = -\log B \\ Bk = Min(Cy, M, Ye) \end{bmatrix}$$

$R = Y + (R - Y)$ $G = Y + \{0.3(R - Y) + 0.11(B - Y)\}$ $0.59 - B$ $Y + (B - Y)$ and $Cy = -\log R$
$= -\log B$
$= Min (Cy, M, Ye)$ where R, G and B are additive primaries of red, green and blue, respectively.

The values Bk calculated as above are stored for each combination of Y, R-Y and B-Y.

In the conventional examples shown in FIGS. 2 and 3, it is necessary to input three signals Y, R-Y and B-Y to the black generation table 201. Thus, the capacity of the table made of, for example, ROMs becomes large, and hence the whole circuit becomes bulky. The process of Bk=Min(Cy, M, Ye) is fundamental to the under color removal so that the above problem of large capacity arises not only for the combination of Y, R-Y and B-Y but also for the other color specification systems.

To solve the above disadvantages, the present applicant has proposed in U.S. application Ser. Nos. 585,602 and 029,386 the technology of reducing the memory capacity by changing the number of masking input bits in accordance with color signal components. Masking process using luminance Y, hue H and chroma C or using R-Y, B-Y and luminance Y has also been proposed in U.S. application Ser. Nos. 838,785 and 838,784, respectively.

The present invention provides an improved technology of the above conventional proposals.

SUMMARY OF THE INVENTION

It is an object of the present invention to provide a color image signal processing method and apparatus eliminating the above-described disadvantages of the prior art.

It is another object of the present invention to provide a color image signal processing method and apparatus capable of forming a good image with a small circuit scale without lowering a color reproduction precision as much as possible.

It is a further object of the present invention to achieve a proper color correction only through hue correction, by paying attention to the fact that the objective of color correction is mainly hue correction.

It is another object of the present invention to provide a color image forming method and apparatus for forming a color image by generating black image data based on two color components at most, and with a small circuit scale.

Other objects of the present invention will become apparent from the following detailed description and the accompanying drawings.

BRIEF DESCRIPTION OF THE DRAWINGS

FIG. 4 is a block diagram showing a first embodiment of color image signal processing according to the present invention;

FIG. 6 is a block diagram showing a second embodiment of color image signal processing according to the present invention;

FIG. 8 is a block diagram showing a third embodiment of color image signal processing according to the present invention.

DESCRIPTION OF THE PREFERRED EMBODIMENTS

Figure 1:
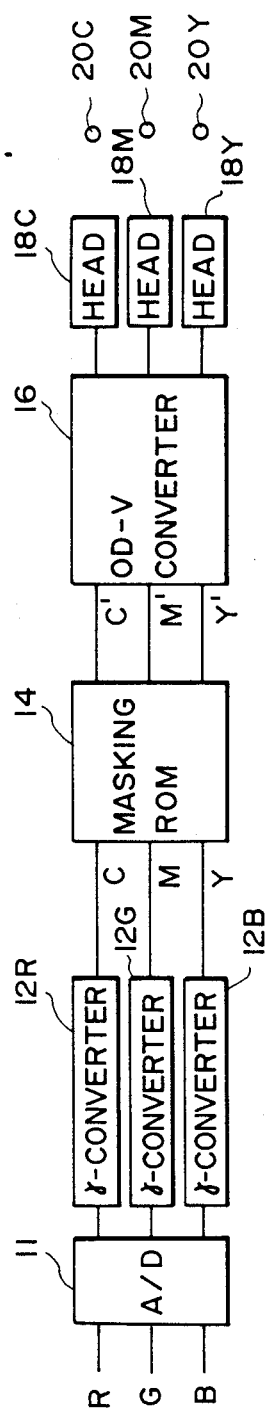
FIG. 1 is a block diagram showing a conventional color image signal processing apparatus.
Figure 2:
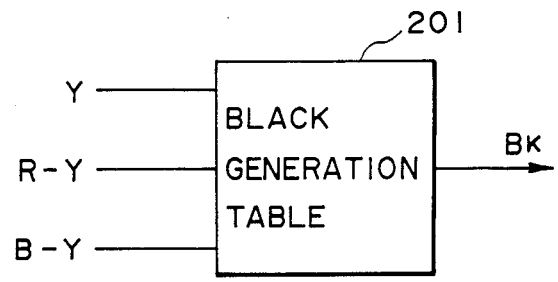
FIG. 2 shows a conventional black generation table.
Figure 3:
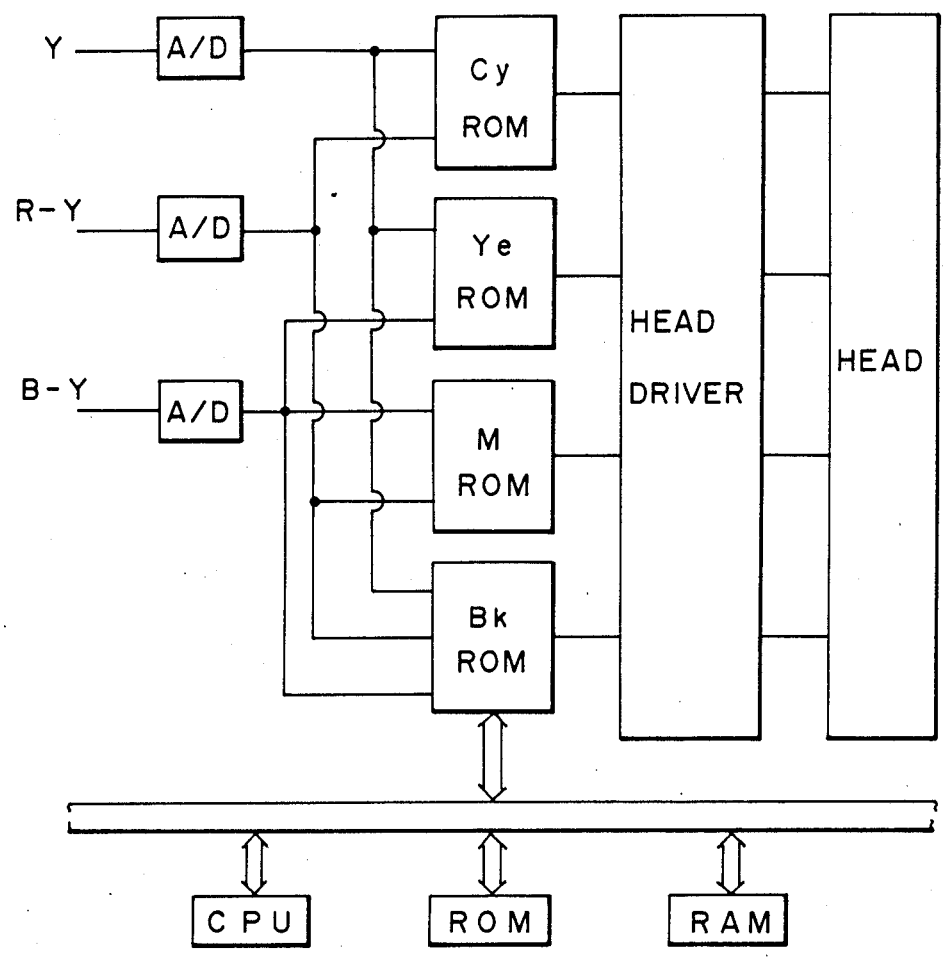
FIG. 3 is a block diagram showing another conventional color image signal processing apparatus.

FIG. 4 is a block diagram showing a first embodiment of an ink-jet printer for forming a color image from color video signals. Elements having the same function as those in FIG. 1 are represented by identical reference numbers.

In the apparatus shown in FIG. 4, there are provided a converter 19 for converting input analog signals R, G and B into analog luminance signal Y*, hue signal H and chroma signal C*, an A/D converter 21 for converting the inputted signals Y*, H and C* from the converter 19 into digital signals, a gradation set unit for setting the gradation conversion characteristic, a gradation converter 22 for gradation converting the luminance signal Y* from the A/D converter in accordance with the conversion characteristic set by the set unit 20, and a masking ROM 24 for masking the inputted hue signal H and chroma signal C* from the A/D converter 21 and gradation converted luminance signal Y** from the gradation converter 22.

The operation will be described in the order of signal processing sequence. In this embodiment, analog R, G and B signals are converted into luminance signal Y*, hue signal H and chroma signal C* by the converter 19.

First Y* is obtained from analog video signals R, G and B: $Y^* = 0.30R + 0.59G + 0.11B$ Spectrum tristimulus values X, Y and Z are converted from R, G and B signals by the following matrix calculation:

$$\begin{pmatrix} X \\ Y \\ Z \end{pmatrix} = \begin{pmatrix} 0.6067, 0.1736, 0.2001 \\ 0.2988, 0.5868, 0.1144 \\ 0, 0.0661, 1.1150 \end{pmatrix} \begin{pmatrix} R \\ G \\ B \end{pmatrix}$$

/0.6067, 0.1736, 0.2001 /R
=/ 0.2988, 0.5868, 0.1144 G Y
Z / 0, 0.0661, 1.1150 / : B /

The spectrum tristimulus values are converted into x and y signals representative of chromaticity:

$$x = \frac{X}{X + Y + Z}$$

$$y = \frac{Y}{X + Y + Z}$$

X x =
X +Y +Z
Y y =
X +Y +Z

Taking the chromaticity of a white point as $(X_0, Y_0)$, the hue signal H is obtained as follows:

$$H = \arctan \frac{y - y_0}{x - x_0} \text{ where } x \neq x_0$$

$x = x_0, \quad y - y_0 > 0 \rightarrow H = \pi$
$\quad\quad\quad y - y_0 < 0 \rightarrow H = 0$ y - y° H =arctan where x x'
x - x° x =x° , y - y° >0 H = r
y - y° <0 H =0
The chroma signal C* is obtained as follows:

$$C^* = \sqrt{(x - x_0)^2 + (y - y_0)^2}$$

C'=/( x - x' ), +( y - y: )

Figure 5:
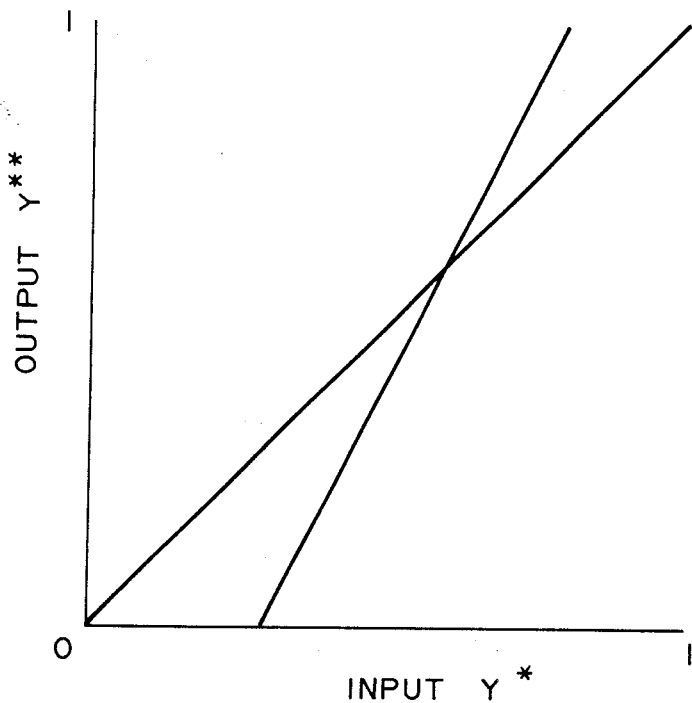
FIG. 5 shows the input/output characteristics of the gradation converter shown in FIG. 4.

The luminance signal converted into a digital signal by the A/D converter 21 is inputted to the gradation set unit 20 and the gradation converter 22. The gradation converter 22 has a plurality of conversion tables having the input/output characteristic, e.g., as shown in FIG. 5, one of which tables is selected in accordance with an instruction from the gradation set unit 20. The set unit 20 selects a conversion characteristic by detecting, for example, the frequency distribution or maximum and minimum values of the luminance signal Y*. The luminance signal Y** gradation-converted by the gradation converter 22 is inputted as an address signal to one input terminal of the masking ROM 24. The hue signal H and chroma signal C* are converted into digital signals by the A/D converter 21 and directly inputted as address signals to the other input terminals of the masking ROM 24.

The masking ROM 24 performs inverse conversion from signals Y**, H and C* into R, G and B signals, complementary color conversion from R, G and B signals into complementary signals Cy, M and Ye, and masking processing. The above three processings can be performed at a time through table conversion. The contents of such processings will be described hereinunder.

First the conversion from signals Y**, H and C* into R, G and B is effected:

$$\begin{cases} x = C^* \times \cos(H) + x_0 \\ y = C^* \times \sin(H) + y_0 \end{cases}$$

$$\begin{cases} X = x \times \frac{Y}{y} \\ Z = \frac{Y}{y} - X - Y \end{cases}$$

$$\begin{pmatrix} R \\ G \\ B \end{pmatrix} = \begin{pmatrix} 0.6067, 0.1736, 0.2001 \\ 0.2988, 0.5868, 0.1144 \\ 0, 0.0661, 1.1150 \end{pmatrix}^{-1} \begin{pmatrix} X \\ Y \\ Z \end{pmatrix}$$

[x =C* x cos (H) +x:
y =C* x sin (H) +y°
Y
X =x x
y
Y
[Z =- X - Y
y $$\begin{pmatrix} R \\ G \\ B \end{pmatrix} = \begin{pmatrix} 0.6067, & 0.1736, & 0.2001 \\ 0.2988, & 0.5868, & 0.1144 \\ 0, & 0.0661, & 1.1150 \end{pmatrix}^{-1} \begin{pmatrix} X \\ Y \\ Z \end{pmatrix}$$

The complementary color conversion is effected as follows:

$$Cy = -\log(R/R_0)$$

$$M = -\log(G/G_0)$$

$$Ye = -\log(B/B_0)$$

where $R_0$, $G_0$ and $B_0$ are constants.

The masking processing of signals Cy, M and Ye is performed as in the following:

$$\begin{pmatrix} Cy' \\ M' \\ Ye' \end{pmatrix} = \begin{pmatrix} a_{11}, & a_{12}, & a_{13} \\ a_{21}, & a_{22}, & a_{23} \\ a_{31}, & a_{32}, & a_{33} \end{pmatrix} \begin{pmatrix} Cy \\ M \\ Ye \end{pmatrix}$$

As a result, signals Cy', M' and Ye' representative of OD values are unanimously obtained from signals Y**, H and C*.

In the masking ROM 24, the values of signals Cy', M' and Ye' are stored at addresses composed of upper, middle and lower bits which correspond to the digital values of signals Y**, H and C*, respectively. The parameters $a_{11}$ to $a_{33}$ in the masking matrix can be determined by first obtaining color prints and measuring the prints using the least square method. Taking the visual characteristics into consideration, the number of bits of the masking ROM 24 inputted with signal Y**, H and C* may be set such that a large number of bits are assigned to the luminance signal, whereas a small number of bits are assigned to the hue and chroma signals. Thus, the table capacity can be reduced. In this example, 7 bits are assigned to signal Y**, and 5 bits to each signal H and C*.

In the above embodiment, signals x and y representative of the chromaticity are converted into hue signal and chroma signal. However, similar conversion may be made using signals (R-Y, B-Y), U*, V*, a*, b* and etc.

As described so far, according to the first embodiment, the image information signal is divided into luminance, hue and chroma signals, and the masking processing is performed with a greater information amount assigned to the luminance signal. Consequently, not only the circuit scale of the masking circuit can be reduced, but also a precise color correction can be achieved.

Next, a second embodiment of the invention will be described. FIG. 6 is a block diagram showing the second embodiment of the color image signal processing.

Figure 7:
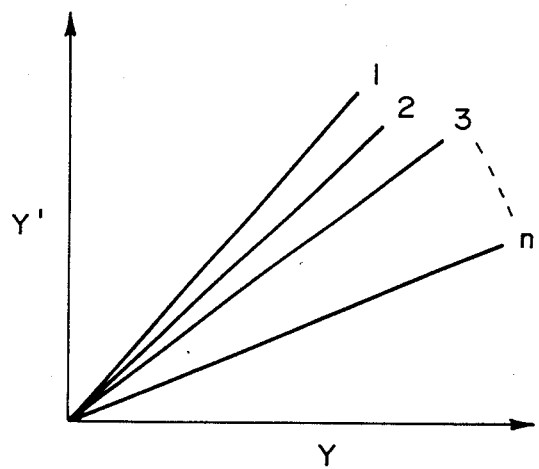
FIG. 7 shows the input/output characteristics of the gradation converter shown in FIG. 6.

Three signals are inputted, i.e., luminance signal Y, hue signal H and chroma signal C. The inputted signals are converted into digital signals by an A/D converters 110Y, 11C and 110H. The luminance signal Y is subjected to gradation conversion by a gradation converter 120 which has ROMs into which a plurality of conversion characteristic curves as shown in FIG. 7 have previously been written in the form of tables. The output Y' from the gradation converter 120 can be obtained through table conversion of a selected conversion characteristic curve.

The hue signal is inputted as an address to a color correction converter 130 into which corrected values for each hue have previously been written in the form of tables. The color correction converter 130 outputs a corrected value at the inputted address. The proper correction values to be stored may be determined by first printing with an ink actually to be used for printing and then checking the color reproduction of such ink. The color corrected hue signal H', gradation-converted luminance signal Y' and chroma signal C are converted into densities by a density converter 140. The conversion is effected as in the following:

$$R - Y = C \times \sin H' \qquad (1)$$
$$B - Y = C \times \cos H'$$
$$\quad = C \times \sin\left(\frac{\pi}{2} - H'\right)$$

$$R = (R - Y) + Y' \qquad (2)$$
$$B = (B - Y) + Y'$$
$$G = (Y' - 0.3\,R' - 0.11B')/0.59$$

R - Y = C x sin H'
B - Y = C ' cos H' ----(1)
    = C x sin - H')
R = ( R - Y ) + Y'
B = ( B - Y ) + Y' ----(2)
G = ( Y' - 0.3 R' - 0.11B' )/0.59

The calculation (1) may be achieved using a table conversion ROM storing the calculation results of trigonometric functions.

The calculation (2) may be achieved by software calculation.

Density signals Cy, M and Ye are calculated from R, G and B by:

$$Cy = -\log R/R_0$$

$$M = -\log G/G_0 \qquad (3)$$

$$Ye = -\log B/B_0$$

This calculation may be achieved using a table storing the logarithmic calculation results.

As a result, density values Cy, M and Ye to be used for printing by heads 160, can be calculated and converted to analog form by D/A converters 150, after color correction and the like of luminance, hue and chroma signals.

Instead of input signals composed of luminance, hue and chroma signals, R, G and B input signals may be used by providing a processor performing the following calculation:

$$\begin{pmatrix} Y \\ R - Y \\ B - Y \end{pmatrix} = \begin{pmatrix} 0.3, & 0.59, & 0.11 \\ 0.7, & -0.59, & -0.11 \\ -0.3, & -0.59, & 0.89 \end{pmatrix} \begin{pmatrix} R \\ G \\ B \end{pmatrix}$$

$$H = \text{ARCTAN}\left(\frac{(B - Y)}{(R - Y)}\right)$$

-continued $$C = \sqrt{(R-Y)^2 + (B-Y)^2}$$

Y / 0.3, 0.59, 0.11 /R
R Y =0.7, -0.59, -0.11 G
B Y/ :-0.3, -0.59, 0.89 'B /
( B - Y )
H A R C T A N ( )
( R - Y ) ? -------- C =/( R - Y )z +( B - Y )z

The color correction converter 130 are constructed of memories such as ROMs and RAMs.

According to this embodiment, it is possible to provide a color image signal processing apparatus with a good color reproductivity without increasing the capacity of table conversion memories.

Next, a third embodiment of the present invention will be described. According to the third embodiment, the color image forming method of producing a color image using subtractive primaries color image data and black color image data based on color image signals, comprises the steps of extracting lightness information components and chroma information components from the color image signals, calculating black image data based on the lightness and chroma information components, and outputting at a same time the primaries color image data and black image date.

The color image forming apparatus wherein color image signals are converted into subtractive primaries color data is constructed of a conversion table inputted with the lightness and chroma information components of the color image signals for converting the components into black image data, wherein a color image is formed using the primaries color image data and the black color image data.

With the construction as above, black image data can be obtained through the input of only two components of lightness and chroma components.

The third embodiment of this invention will be described in detail with reference to FIG. 8.

Principle of the third Embodiment

What the black signal (Bk) means can be considered as in the following:

An image becomes generally dark as the luminance becomes low, i.e., black signal components increase. Thus, it may be concluded that the black signal depends only upon a luminance signal. This conclusion is correct in case of a white-and-black image forming apparatus. However, in case of a color image, the black signal is influenced in practice also by the chroma. Namely, even at a same luminance, the black signal components decrease as the chroma becomes high. In other words, it can be considered that the black signal components are mainly determined by only the luminance and chroma, without considering the influence by the hue. That is, the black signal components are mainly determined by only "brightness (or lightness)" representing the luminance and lightness and "tint (or chroma)" representing the chroma and the like.

In view of the above, the inputs to the table for generating a black signal may use only the "brightness" representing the luminance and lightness and the "tint" representing the chroma and the like.

Construction of the Embodiment

FIG. 8 is a block diagram showing the whole part of the third embodiment of the image forming apparatus applied to an ink-jet printer. For the purpose of description, in the embodiment of FIG. 8, the luminance Y is employed as the "brightness", and the chroma C is employed as the "tint". As the color specification of color image data inputted to the image forming apparatus, (Y, R-Y, B-Y) are used for the contrast with the conventional examples described before.

The operation of the embodiment shown in FIG. 8 will be summarized. Inputted luminance signal Y and color difference signals R-Y and B-Y are converted into digital color image data by A/D converters 210a, 210b, and 210c under control of CPU 220 whose programs are stored in ROM 222 or RAM 221. The digital image data are subjected to masking processing at a masking ROM 211, whereat (Y, R-Y, B-Y) are converted into (Cy, M, Ye). A conversion table 212 extracts a chroma C from (R-Y, B-Y). A Bk ROM 213 is inputted with the chroma Y and the luminance Y to thereby output Bk data.

As a result, color image data of digital (Cy, M, Ye) have been obtained. These digital data are converted into analog signals by D/A converters 214a, 214b, 214c, and 214d, which signals are outputted to a head driver 215 to drive an ink head 216.

The data values of the chroma C stored in the conversion table 212 are calculated by:

$$C = \sqrt{(R-Y)^2 + (B-Y)^2}$$

C /( R - Y ), +( B - Y )
Bk data stored in the Bk ROM 213 are calculated as in the following: First, (R-Y, B-Y) are obtained using the chroma C from the conversion table 212 and the hue H:

$$R-Y = C \times \sin(H)$$

$$B-Y = C \times \cos(H)$$

Since black signal does not depend on the hue H, (R-Y, B-Y) can be calculated with an arbitrarily value of H, e.g., with H=90 degrees:

$$R-Y = 0$$

$$B-Y = 0$$

Next, R, G and B are obtained from (Y, R-Y, B-Y) as in the following:

$$\begin{bmatrix} R = Y + (R-Y) \\ G = Y + \frac{1}{0.59}\{0.3(R-Y) + 0.11(B-Y)\} \\ B = Y + (B-Y) \end{bmatrix}$$

R Y +(R - Y) G Y +{0.3 (R - Y) +0.11 (B - Y)}' 0.59
.B Y +(B - Y)
From R, G and B:

$$\begin{bmatrix} Cy = -\log R \\ M = -\log G \\ Ye = -\log B \end{bmatrix}$$

Cy =-log R M -log G lYe =-log B
Lastly, Bk=Min(Cy, M, Ye) is calculated.

The Bk ROM 213 is inputted with Y and C with H being set arbitrarily. Therefore, black signals Bk can be stored therein beforehand after calculating based on only Y and C.

Cy, M and Ye signals are outputted from the masking ROM 211 inputted with Y, R-Y and B-Y, after ink colorless components are corrected. The stored data in the masking ROM 211 are calculated as in the following: First, R, G and B are calculated based on (Y, R-Y, B-Y):

$$\begin{bmatrix} R = Y + (R - Y) \\ G = Y + \frac{1}{0.59} \{0.3(R - Y) + 0.11(B - Y)\} \\ B = Y + (B - Y) \end{bmatrix}$$

From R, G and B:

$$\begin{bmatrix} Cy = -\log R \\ M = -\log G \\ Ye = -\log B \end{bmatrix}$$

The correction of colorless components is generally calculated by matrix approximation:

$$\begin{bmatrix} Cy \\ M \\ Ye \end{bmatrix} = \begin{bmatrix} a_{11}, a_{12}, a_{13} \\ a_{21}, a_{22}, a_{23} \\ a_{31}, a_{32}, a_{33} \end{bmatrix} \times \begin{bmatrix} Cy \\ M \\ Ye \end{bmatrix}$$

where $a_{11}$ to $a_{33}$ are constant.

The obtained Bk and (Cy, M, Ye) are inputted to the head driver 215.

In the above embodiment, the luminance and two color difference signals are inputted to the printer. However, a printer with R, G and B signals inputted may be used. In this case, the signals are converted into color difference signals through matrix conversion prior to the A/D conversion.

Similarly, YIQ of NTSC system may be applied. In this case, the "tint" becomes $$\sqrt{I^2 + Q^2}.$$

In this case, the "tint" becomes

Although the printer in the above embodiment has been described with emphasis upon the black signal components, obviously the embodiment is applicable to color separation in the fields of printing and etc.

As described so far, in determining the black components, although at least three color image data have been required conventionally, two color image data can suffice according to the present invention. Therefore, if the conversion table for determining the black components practicing the present invention is constructed of ROMs for example, the ROM capacity can be reduced and associated circuits can be simplified.

As seen from the foregoing description of the present invention, the color correction circuit can be simplified, and if the color correction circuit applied with a table reference scheme using memories such as ROMs and RAMs, the memory capacity can be reduced. Further, since the color correction is effected based on the visual sensitivity, a high quality color image can be reproduced even with a simplified color correction circuit.

The present invention is not limited to the above embodiments, but various applications and modification are possible without departing from the scope of the invention as defined by the appended claims.

What we claim is:

1. A color image signal processing apparatus comprising:
   input means for inputting analog color image signals;
   means for obtaining an analog luminance signal, an analog hue signal, and an analog chroma signal based on said analog color image signals; and
   conversion means for converting said analog luminance signal, said analog hue signal and said analog chroma signal into digital signals.

2. An apparatus according to claim 1, wherein said analog color image signals are three primary color component signals.

3. An apparatus according to claim 1, wherein said analog hue signal and said analog chroma signal are obtained based on spectrum tristimulus values obtained through conversion of said analog color image signals.

4. A color signal processing method comprising the steps of:
   obtaining recording original color data other than black image data by correcting input color image signals to be coincident with a color reproduction characteristic; and
   extracting black image data from input luminance information and chroma information, wherein the chroma information is not corrected to be coincident with the color reproduction characteristic.

5. A method according to claim 4, wherein the input color image signals include the luminance information and two color-difference signals.

6. A method according to claim 5, wherein the chroma information is obtained from the two color-difference signals during said extracting step.

7. A method according to claim 4, wherein the recording original color data is obtained by correcting the input color image signals to be coincident with a color reproduction characteristic of a recording material during said obtaining step.

8. A method according to claim 4, wherein the input chroma information is not corrected to be coincident with the color reproduction characteristic of a recording material.

9. A method according to claim 7, wherein the recording material includes an ink.

10. A method according to claim 8, wherein the recording material includes an ink.

11. A color image signal processing apparatus comprising:
    correction means for outputting recording original color data other than black image data by correcting input color image signals to be coincident with a color reproduction characteristic; and
    conversion means for obtaining black image data based on input luminance information and chroma information, wherein said input chroma information is not corrected to be coincident with the color reproduction characteristic.

12. A color image signal processing apparatus according to claim 11, wherein said input color image signals include said luminance information and two color-difference signals.

13. A color image signal processing apparatus according to claim 12, wherein said conversion means obtains said chroma information from said two color-difference signals.

14. A color image signal processing apparatus according to claim 11, wherein said correction means corrects said input color image signals to be coincident with a color reproduction characteristic of a recording material.

15. A color image signal processing apparatus according to claim 11, wherein said input chroma information is not corrected to be coincident with a color reproduction characteristic of a recording material.

16. A color image signal processing apparatus according to 14, wherein said recording material includes an ink.

17. A color image signal processing apparatus according to 15, wherein said recording material includes an ink.

18. A color image signal processing apparatus for an output device having a color reproduction characteristic comprising:
  input means for inputting color image signals composed of a plurality of color component signals;
  means for obtaining a luminance signal, a hue signal and a chroma signal based on said plurality of input color component signals;
  correction means for correcting said hue signal in accordance with said color reproduction characteristic; and
  means for obtaining a recording original color signal for application to said output device based on said hue signal corrected by said correction means, said luminance signal and said chroma signal, correction of said luminance signal according to the color reproduction characteristic not being performed.

19. A color image signal processing apparatus according to claim 18, further comprising means for converting a gradation characteristic of said luminance signal.

20. A color image signal processing apparatus according to claim 18, wherein said correction means is constructed of a memory using said hue signal as an input address and storing beforehand corrected values for respective values of said hue signal.

21. A color signal processing method comprising the steps of:
  inputting luminance information and two color-difference signals;
  correcting said input luminance information and two color-difference signals to be coincident with a color reproduction characteristic and obtaining recording original color data other than black image data;
  extracting chroma information from said two input color-difference signals; and
  obtaining black image data from said input luminance information and chroma information.

22. A color image signal processing apparatus comprising:
  input means for inputting luminance information and two color-difference signals;
  correction means for correcting said input luminance information and two color-difference signals to be coincident with a color reproduction characteristic and outputting recording original color data other than black image data;
  extraction means for extracting chroma information from said two input color-difference signals; and
  conversion means for obtaining black image data based on said input luminance information and said extracted chroma information.

23. A color image signal processing apparatus according to claim 22, wherein said conversion means is constructed of a memory using said luminance information and said chroma information as its input address and outputting the value of said black image data.

24. A color image signal processing apparatus according to claim 18, wherein said correction means corrects said hue signal according to color reproduction characteristic of a recording material.

25. A color image signal processing apparatus according to claim 24, wherein said recording material includes an ink.

26. A method according to claim 21, wherein, in said correcting step, said input luminance information and two color-difference signals are corrected to be coincident with the color reproduction characteristic of a recording material, to obtain the recording original color data other than the black image data.

27. A method according to claim 21, wherein, in said extracting step, said chroma information is extracted from said two input color-difference signals prior to the two input color-difference signals being corrected to be coincident with the color reproduction characteristic of a recording material.

28. A method according to claim 26, wherein the recording material includes an ink.

29. A method according to claim 27, wherein the recording material includes an ink.

30. A color image signal processing apparatus according to claim 22, wherein said correction means corrects said input luminance information and two color-difference signals to be coincident with the color reproduction characteristic of a recording material, to output recording original color data other than said black image data.

31. A color image signal processing apparatus according to claim 22, wherein said extraction means extracts said chroma information from said two input color-difference signals prior to the two input color-difference signals being corrected to be coincident with a color reproduction characteristic of a recording material.

32. A color image signal processing apparatus according to claim 30, wherein said recording material includes an ink.

33. A color image signal processing apparatus according to claim 31, wherein said recording material includes an ink.

* * * * *

UNITED STATES PATENT AND TRADEMARK OFFICE
CERTIFICATE OF CORRECTION

PATENT NO. : 4,965,664

DATED : October 23, 1990

INVENTOR(S) : TOSHIRO UDAGAWA, ET AL.

It is certified that error appears in the above-identified patent and that said Letters Patent is hereby corrected as shown below:

COLUMN 2

Lines 7 to 11 should be deleted.

COLUMN 3

Lines 63 to 66 should be deleted.
Line 67, "$(X_0, Y_0),$" should read --$(X_0, Y_0),$--.

COLUMN 4

Lines 9 to 11 should be deleted.
Line 16 should be deleted.
Line 39, "a time" should read --the same time--.

COLUMN 5

Lines 1 to 4 should be deleted.
Lines 23 to 26 should be deleted.
Line 63, "an" should be deleted.
Line 64, "11C" should read --110C--.

COLUMN 6

Lines 27 to 32 should be deleted.

UNITED STATES PATENT AND TRADEMARK OFFICE
CERTIFICATE OF CORRECTION

PATENT NO. : 4,965,664

DATED : October 23, 1990

INVENTOR(S) : TOSHIRO UDAGAWA, ET AL.

It is certified that error appears in the above-identified patent and that said Letters Patent is hereby corrected as shown below:

COLUMN 7

Lines 4 to 10 should be deleted.
    Line 11, "are" should read --is--.

COLUMN 8

Line 31 should be deleted.
    Line 41, "arbitrarily" should read --arbitrary--.
    Lines 56 and 57 should be deleted.
    Line 65 should be deleted.

COLUMN 9

Lines 15 and 16 should be deleted.
    Lines 24 and 25 should be deleted.
    Lines 33 and 34 should be deleted.
    Line 35, "constant." should read --constants.--.
    Lines 50 and 51 should be deleted.

COLUMN 10

Line 5, "modification" should read --modifications--.

UNITED STATES PATENT AND TRADEMARK OFFICE
CERTIFICATE OF CORRECTION

PATENT NO. : 4,965,664
DATED : October 23, 1990
INVENTOR(S) : TOSHIRO UDAGAWA, ET AL. Page 3 of 3

It is certified that error appears in the above-identified patent and that said Letters Patent is hereby corrected as shown below:

COLUMN 11

Line 18, "to 14," should read --to claim 14,--.
Line 21, "to 15," shold read --to claim 15,--.

Signed and Sealed this

Ninth Day of June, 1992

Attest:

DOUGLAS B. COMER

*Attesting Officer*     Acting Commissioner of Patents and Trademarks